United States Patent [19]
Hiscock

[11] Patent Number: 5,390,889
[45] Date of Patent: Feb. 21, 1995

[54] POSTER CLAMP

[76] Inventor: Anthony S. Hiscock, 977 Pitcairn Court, Kelowna, British Columbia, Canada, V1Y 4E5

[21] Appl. No.: 171,514

[22] Filed: Dec. 21, 1993

[51] Int. Cl.$^6$ .................................................. A47F 7/14
[52] U.S. Cl. ................................. 248/488; 24/67 CF; 40/159.1; 248/467
[58] Field of Search ................. 248/488, 467; 40/156, 40/159.1, 152.1, 597; 24/67 CF, 67 AR

[56] References Cited

U.S. PATENT DOCUMENTS

| D. 311,029 | 10/1990 | Nielson | 40/597 X |
|---|---|---|---|
| 1,301,885 | 4/1919 | Tobiason et al. | |
| 1,575,789 | 3/1926 | Phelps | |
| 1,632,856 | 6/1927 | Running | |
| 2,143,608 | 1/1939 | Morris | 20/40.5 |
| 2,843,901 | 7/1958 | Bukowski | 24/66 |
| 4,190,157 | 2/1980 | Chatham | 206/477 |
| 4,268,000 | 5/1981 | Ulm | 248/467 |
| 4,459,773 | 7/1984 | Sandlin | 40/156 X |
| 4,497,125 | 2/1985 | Hutchinson | 40/10 R |
| 4,525,115 | 6/1985 | Garner | 40/159.1 X |
| 4,673,152 | 6/1987 | Brown | 248/488 X |
| 4,858,875 | 8/1989 | Nielson | 248/488 |
| 4,899,974 | 2/1990 | Wear et al. | 248/467 |
| 5,199,681 | 4/1993 | Reidy | 248/488 |
| 5,212,850 | 5/1993 | Perolle | 24/67 CF |
| 5,255,458 | 10/1993 | Piel | 24/67 CF |

FOREIGN PATENT DOCUMENTS

| 593125 | 2/1934 | Germany | 40/159.1 |
|---|---|---|---|
| 16652 | 6/1956 | Germany | 81 C/8 |
| 8500077 | 8/1986 | Netherlands | 248/467 |
| 282101 | 1/1929 | United Kingdom | 248/488 |

Primary Examiner—J. Franklin Foss
Attorney, Agent, or Firm—Baker, Maxham, Jester & Meador; Lawrence A. Maxham

[57] ABSTRACT

A poster clamp having a clam-shell clamp having an upper member and a lower member, the upper and lower members rotatable about a common hinge between open and closed positions, and when in the closed position a first clamp arm on the upper member overlaying a first clamp arm on the lower members, and when in the closed position a second clamp arm on the upper member, coplanar with the first clamp arm on the upper member, overlaying a second clamp arm on the lower member, the second clamp arm on the lower member coplanar with the first clamp arm on the lower member, the second clamp arms extending substantially at right angles to the first clamp arms, the first and second clamp arms having longitudinal outside edges, the hinge along the longitudinal outside edges of the first clamp arms, whereby when in the closed position the first and second arms of the upper member are in substantially parallel engagement with the first and second arms of the lower member to thereby releasably frictionally engage a sheet placed between the upper and lower members.

9 Claims, 3 Drawing Sheets

POSTER CLAMP

FIELD OF THE INVENTION

This invention relates to devices for hanging posters or like wall hangings from smooth surfaces such as glass windows.

BACKGROUND OF THE INVENTION

It is often desirable to hang posters such as advertising posters or other sheet-like material in a commercial establishment without having to go to the expense of providing frames.

The applicant is aware of prior art display clip structures or supporting clamps, notably, U.S. Pat. No. 4,899,974, which issued to Wear et al on Feb. 13, 1990 for a Display Clip Structure, and U.S. Pat. No. 1,301,885, which issued to Tobiason et al on Apr. 29, 1919 for a Supporting Clamp. Wear et al discloses a sheet retaining clip supported in one embodiment by a suction cup. Tobiason et al teaches a sheet retaining clip or clamp also supported by a suction cup, the clamp having arms for frictionally engaging therebetween a sheet. Both the Wear et al and the Tobiason devices retain sheets within a single set of arms for frictionally engaging the sheet. These devices support tension applied to the sheet in one direction, generally colinear with the suction cup support and perpendicular to the frictional engaging means by which the sheet is clamped between the arms.

The applicant is further aware of U.S. Pat. No. 5,199,681 which issued to Reidy on Apr. 6, 1993 for Bracket System For Mounting Posters On Walls. Reidy discloses frictionally engaging the corners of sheets in an L-shaped bracket, the means for frictionally engaging the sheet corner being a rotatable member pivotably mounted at the corner of the bracket, the member having frictional engaging means which are engaged with the sheet when the member is rotated into engagement with one arm of the L-shaped bracket. The frictional engaging means disclosed is a protruding bump on the rotatable member and a corresponding groove on the L-shaped bracket for mating of the bump within the groove when the member is rotated into engagement with the bracket, frictionally engaging a corner of the sheet between the bump and the groove. The unit, comprising the L-shaped bracket and rotatable member, is supported on a wall or like surface by pushing a tack-like protrusion which extends perpendicular to the plane of the bracket into the wall or like surface. Similar to the Wear et al and Tobiason et al devices, the Reidy invention teaches tensioning a sheet in one direction, that is, along an axis co-linear with the support means attached to the wall.

It is an object of this invention that the bracket of the present invention not only support the corner of a sheet or poster along both arms of an L-shaped bracket but also frictionally engage the sheet or poster along those arms so that the sheet or poster is tensioned in 2 directions.

SUMMARY OF THE INVENTION

The present invention comprises two "L"-shaped planar arms pivotably joined together along a common hinged edge so as to form a clam-shell clamp. One such clamp may be used at each corner of a wall hanging, each clamp positioned on a corner of the wall hanging. When clamped shut, the clamp frictionally engages the wall hanging between the inner surfaces of the clam-shell arms.

The inner surfaces of the clam-shell arms may have a stippled surface or a surface with like roughening so as to increase the friction between the inside surface of each clam-shell arm and the corresponding surface of the wall hanging being clamped.

Suction cups are mounted to the exterior surface of one of the clam-shell arms so as to mount the clamp to a window pane or like surface. The suction cups may be mounted to the exterior surface of one of the clam-shell arms by journalling a protrusion extending from the top of each suction cup into a correspondingly sized hole in the clam-shell arm. It has been found advantageous that the protrusion from the top of the suction cups extends through the hole in the clam-shell arm so as to extend partially above the inside surface of the clam-shell arm. These protrusions assist in frictionally engaging the wall hanging clamped between the clam-shell arms.

In an alternative embodiment the stippling or like roughening of the interior surfaces of the clam-shell arms may be replaced with sinusoidal-like undulations of the interior surface of the clam-shell arms so that when the clam-shell arms are clamped closed the shape of the interior surfaces of the arms traps and sinusoidally bends a sheet placed therebetween.

A poster clamp comprises a clam-shell clamp having an upper member and a lower member, the upper and lower members rotatable about a common hinge between open and closed positions, and when in the closed position a first clamp arm on the upper member overlaying a first clamp arm on the lower member, and when in the closed position a second clamp arm on the upper member, coplanar with the first clamp arm on the upper member, overlaying a second clamp arm on the lower member, the second clamp arm on the lower member coplanar with the first clamp arm on the lower member, the second clamp arms extending substantially at right angles to the first clamp arms, the first and second clamp arms having longitudinal outside edges, the hinge along the longitudinal outside edges of the first clamp arms, whereby when in the closed position the first and second arms of the upper member are in substantially parallel engagement with the first and second arms of the lower member to thereby releasably frictionally engage a sheet placed between the upper and lower members.

The first and second arms have first and second inner surfaces respectively, the first and second surfaces further comprising frictional engaging means for frictionally engaging the sheet between the upper and lower members when the upper and lower members are brought into the substantially parallel engagement.

A poster clamp further comprises locking means for locking the upper member in substantially parallel engagement with the lower member, wherein the locking means comprises a locking member depending from one of the longitudinal outside edges of the second clamp arms for releasable locking engagement with the other of the second clamp arms.

The frictional engaging means comprise raised protrusions on opposed faces of the upper and lower members when the upper and lower members are in the substantially parallel engagement.

The raised protrusions are parallel ridges running substantially the length of the first and second clamp arms.

The frictional engaging means comprises a first undulating surface on the upper member and a second undulating surface on the lower member, and wherein the first and second undulating surfaces are opposed surfaces when the upper and lower members are in the substantially parallel engagement.

The undulating surfaces have raised areas and depressed areas and the first undulating surface mates with the second undulating surface whereby the raised areas of the first undulating surface mate with the depressed areas of the second undulating surface and the depressed areas of the first undulating surface mate with the raised areas of the second undulating surface.

A poster clamp further comprises means for mounting the poster clamp to a vertical surface, wherein the means comprises at least one suction cup having a protrusion extending from the back of the suction cup for snug mating in a correspondingly sized hole in the lower member whereby when the resilient protrusion is mated in the hole the resilient protrusion extends through the hole and above the inner surface on the lower member.

DETAILED DESCRIPTION OF PREFERRED EMBODIMENTS

Figure 1:
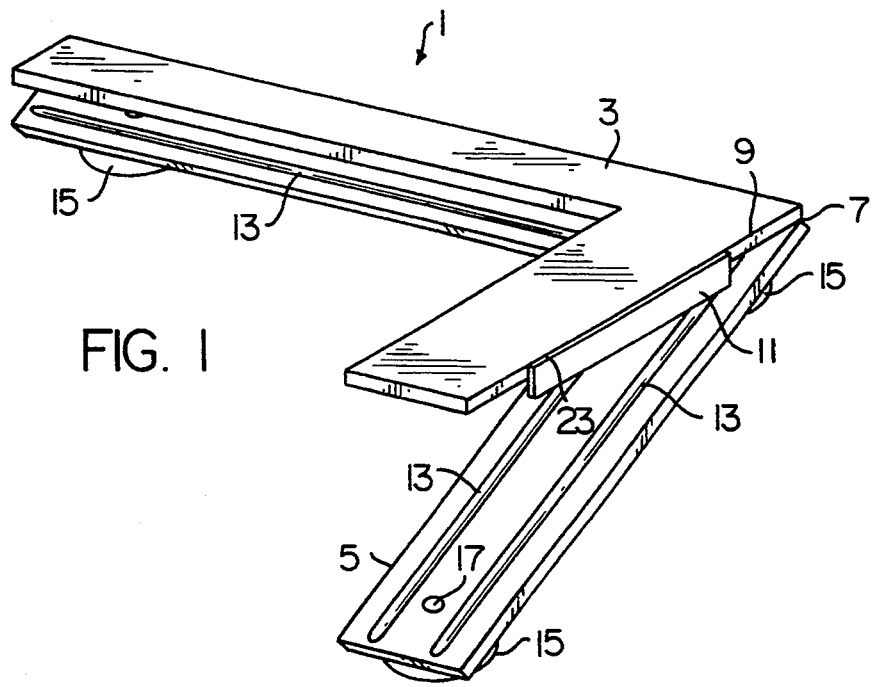
FIG. 1 is a perspective view of the front right of the clamp of the present invention in its' open position.

As illustrated in FIG. 1, clamp 1 is comprised of a top planar L-shaped arm 3 and bottom planar L-shaped arm 5. Arms 3 and 5 are pivotally connected along a common hinged edge 7 to form a clam-shell arrangement, illustrated in FIG. 1 in the open position. Common hinged edge 7 may be formed in the injection molding process used to manufacture arms 3 and 5, whereby a thin strip of the injected material connects the molder arms 3 and 5 to form hinge 7 once removed from the mold. The injected material may be plastics ordinarily used for such purposes.

Top arm 3 has depending from its' outer non-hinged edge 9 clasp member 11.

Each arm 3 or 5 may be thought of as comprising two perpendicular segments, the two perpendicular segments joined to form the "L" shape. The interior surfaces of the arms have friction bars 13 running longitudinally along each of their respective two perpendicular segments. Friction bars 13 may be two such bars running parallel along the length of each segment.

Attached to the lower surface of bottom arm 5 are three suction cups 15. Suction cups 15 are attached to bottom arm 5 by resilient protrusions 17 which are forced through holes in bottom arm 5.

Figure 2:
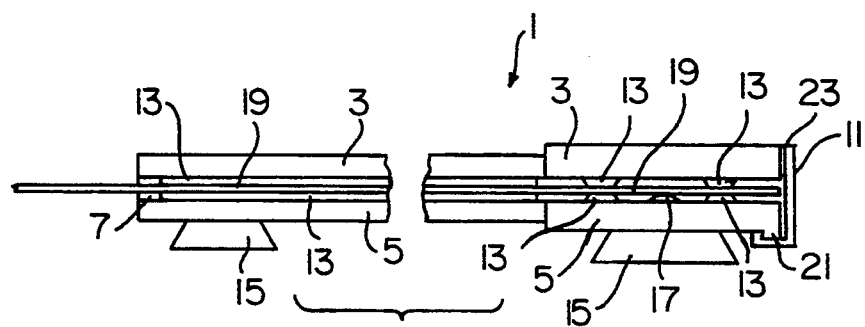
FIG. 2 is a front elevation view of the clamp of FIG. 1 when closed.

Illustrated in FIG. 2 is clamp 1 in the closed position. Flimsy sheet 19 is pinched in frictional engagement between friction bars 13. Top arm 3 is held in close proximity to bottom arm 5 by clasp member 11 engaging clasp lip 21 on bottom arm 5. Clasp member 11 is connected to upper arm 3 along resilient hinge line 23.

Figure 3:
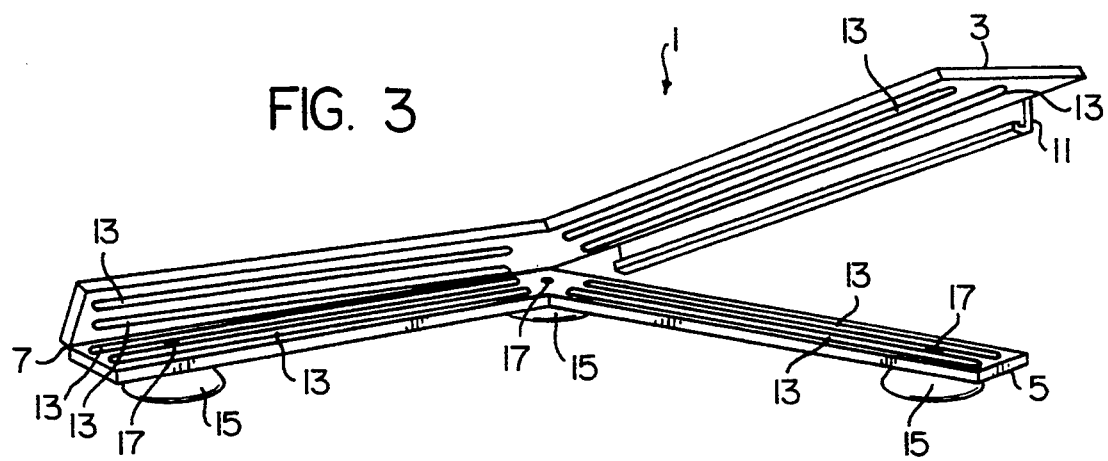
FIG. 3 is a perspective view of the left front of the clamp of FIG. 1.

In FIG. 3, clamp 1 is illustrated in the open position showing the interior surfaces of top arm 3 and bottom arm 5. It may be seen that friction bars 13 extend along substantially the entire length of top arm 3 and bottom arm 5, and that resilient protrusions 17 protrude above the interior surface of bottom arm 5 in three places corresponding to the placement of the three suction cups 15.

Figure 4:
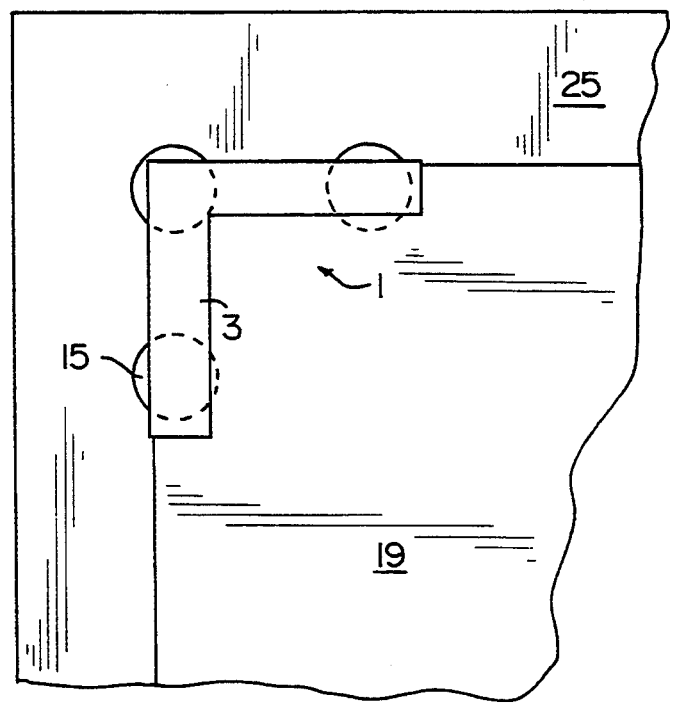
FIG. 4 is a plan view of the clamp of the present invention supporting a sheet and mounted.

FIG. 4 illustrates how flimsy sheet 19, once engaged between top arm 3 and bottom arm 5 of clamp 1, may be removably mounted to a flat surface such as a mirror or pane of glass by means of suction cups 15.

Figure 5:
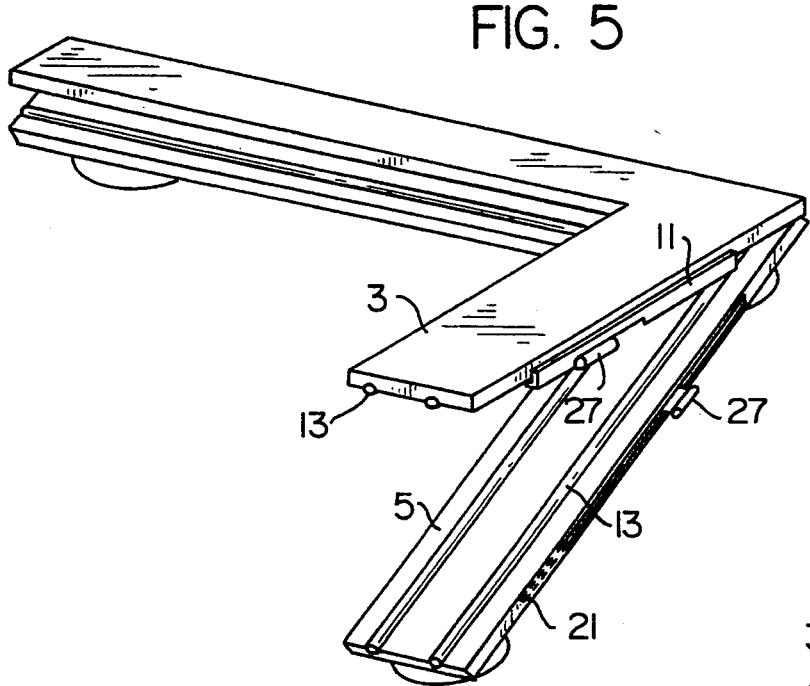
FIG. 5 is a perspective view of the front right of a further embodiment of the clamp of FIG. 1.
Figure 6:
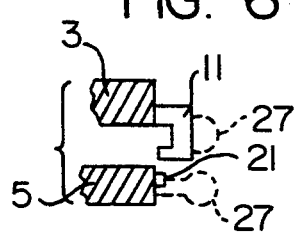
FIG. 6 is a cut-away elevation view of the embodiment in FIG. 5.

FIG. 5 illustrates a further embodiment of clasp member 11. Rather than being mounted to top arm 3 by clasp hinge 23, clasp member 11 is rigidly mounted to top arm 3. Viewed in end profile, clasp member 11 is substantially in the shape of a reversed "C". The bottom leg of the reversed "C" engages clasp lip 21 which in this embodiment extends from bottom arm 5 horizontally outwards. Thumb rests 27 are provided, one on clasp member 11 and another on bottom arm 5. Thumb rests 27 are positioned so that when clamp 1 is closed, thumb rests 27 are substantially aligned, lying along the outermost edge of bottom arm 5. Clamp 1 may thereby be opened by resting thumb and forefinger on thumb rests 27 and applying a twisting motion to disengage clasp member 11 from clasp lip 21.

The embodiment illustrated in FIG. 5 of clamp 1 illustrates an alternative embodiment for friction bars 13. In an alternative embodiment, friction bars 13 are thin strips, possibly cylindrical, of rubber of like resilient material which are held in place within a snug friction fitting groove on the interior surfaces of top arm 3 and bottom arm 5. Resilient protrusions 17 are not evident as in an alternative embodiment, suction cups 15 are secured to the bottom surface of bottom arm 5 by means of a molded protrusion, possibly in the form of a screw or like fastener which is formed during the molding process manufacturing clamp 1. Although the protrusions in this alternative embodiment for securing suction cups 15 is not shown in FIG. 5, their shape follows from the requirement that they screw or friction fit into an aperture in suction cups 15, the aperture being in the alternative to protrusions 17.

Figure 7:
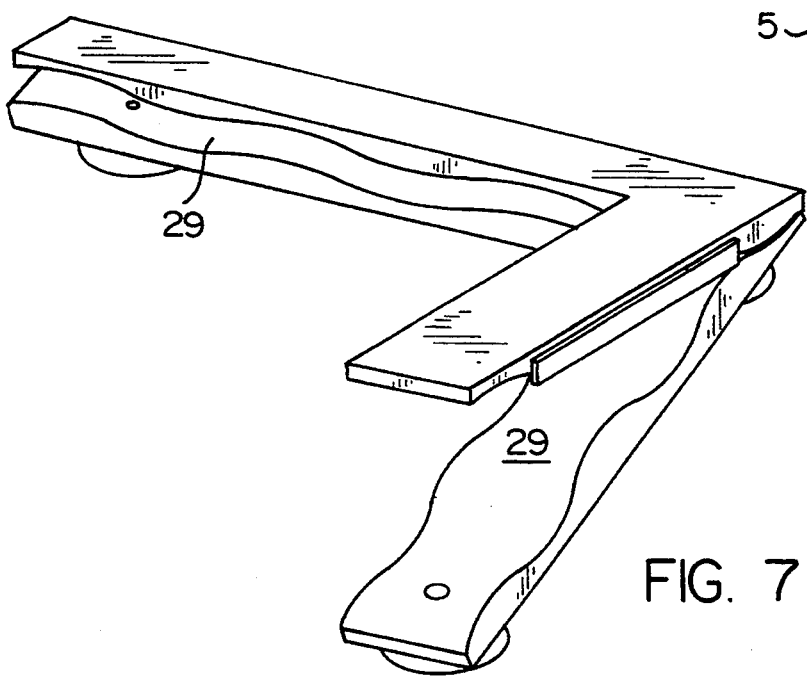
FIG. 7 is a perspective view of the front right of an alternative embodiment of the clamp of the present invention.

As will be apparent to those skilled in the art in the light of the foregoing disclosure, many alterations and modifications are possible in the practice of this invention without departing from the spirit or scope thereof. For example, as depicted in FIG. 7, friction bars 13 may be replaced by undulating surfaces 29 on the opposed surfaces of top arm 3 and bottom arm 5 in order to frictionally hold a sheet by means of bending the sheet between arms 3 and 5 when clamp 1 is closed. Accordingly, the scope of the invention is to be construed in accordance with the substance defined by the following claims.

What is claimed is:

1. A poster clamp comprising a clam-shell clamp having an upper member and a lower member, said upper and lower members rotatable about a common hinge between open and closed positions, and when in said closed position a first clamp arm on said upper member overlaying a first clamp arm on said lower member, and when in said closed position a second clamp arm on said upper member, coplanar with said first clamp arm on said upper member, overlaying a second clamp arm on said lower member, said second clamp arm on said lower member coplanar with said first clamp arm on said lower member, said second clamp arms extending substantially at right angles to said first clamp arms, said first and second clamp arms having longitudinal outside edges, said hinge along said longitudinal outside edges of said first clamp arms, whereby when in said closed position said first and second arms of said upper member are in substantially parallel engagement with said first and second arms of said lower member to thereby releasably frictionally engage a sheet placed between said upper and lower members.

2. The device of claim 1 wherein said first and second arms have first and second inner surfaces respectively, said first and second surfaces further comprising frictional engaging means for frictionally engaging said sheet between said upper and lower members when said upper and lower members are brought into said substantially parallel engagement.

3. The device of claim 2 further comprising locking means for locking said upper member in substantially parallel engagement with said lower member, wherein said locking means comprises a locking member depending from one of said longitudinal outside edges of said second clamp arms for releasable locking engagement with the other of said second clamp arms.

4. The device of claim 2 wherein said frictional engaging means comprise raised protrusions on opposed faces of said upper and lower members when said upper and lower members are in said substantially parallel engagement.

5. The device of claim 4 wherein said raised protrusions are parallel ridges running substantially the length of said first and second clamp arms.

6. The device of claim 2 wherein said frictional engaging means comprises a first undulating surface on said upper member and a second undulating surface on said lower member, and wherein said first and second undulating surfaces are opposed surfaces when said upper and lower members are in said substantially parallel engagement.

7. The device of claim 6 wherein said undulating surfaces have raised areas and depressed areas and said first undulating surface mates with said second undulating surface whereby said raised areas of said first undulating surface mate with said depressed areas of said second undulating surface and said depressed areas of said first undulating surface mate with said raised areas of said second undulating surface.

8. The device of claim 3 further comprising means for mounting said poster clamp to a vertical surface, wherein said means comprises at least one suction cup having a protrusion extending from the back of said suction cup for snug mating in a correspondingly sized hole in said lower member whereby when said resilient protrusion is mated in said hole said resilient protrusion extends through said hole and above said inner surface on said lower member.

9. A poster clamp comprising a clam-shell clamp having an upper member and a lower member, said upper and lower members rotatable about a common hinge between open and closed positions, and when in said closed position a first clamp arm on said upper member overlaying a first clamp arm on said lower member, and when in said closed position a second clamp arm on said upper member, coplanar with said first clamp arm on said upper member, overlaying a second clamp arm on said lower member, said second clamp arm on said lower member coplanar with said first clamp arm on said lower member, said second clamp arms extending substantially at right angles to said first clamp arms, said first and second clamp arms having longitudinal outside edges, said hinge along said longitudinal outside edges of said first clamp arms, whereby when in said closed position said first and second arms of said upper member are in substantially parallel engagement with said first and second arms of said lower member to thereby releasably frictionally engage a sheet placed between said upper and lower members, wherein said first and second arms have first and second inner surfaces respectively, said first and second surfaces further comprising frictional engaging means for frictionally engaging said sheet between said upper and lower members when said upper and lower members are brought into said substantially parallel engagement, wherein locking means for locking said upper member in substantially parallel engagement with said lower member, wherein said locking means comprises a locking member depending from one of said longitudinal outside edges of said second clamp arms for releasable locking engagement with the other of said second clamp arms, wherein said frictional engaging means comprise raised protrusions on opposed faces of said upper and lower members when said upper and lower members are in said substantially parallel engagement, wherein said raised protrusions are parallel ridges running substantially the length of said first and second clamp arms, wherein the device of claim 3 further comprising means for mounting said poster clamp to a vertical surface, wherein said means comprises at least one suction cup having a protrusion extending from the back of said suction cup for snug mating in a correspondingly sized hole in said lower member whereby when said resilient protrusion is mated in said hole said resilient protrusion extends through said hole and above said inner surface on said lower member.

* * * * *